US010789629B2

(12) United States Patent
Murray

(10) Patent No.: US 10,789,629 B2
(45) Date of Patent: Sep. 29, 2020

(54) CONTENT PURCHASING

(71) Applicant: Google LLC, Mountain View, CA (US)

(72) Inventor: Abraham Murray, Scituate, MA (US)

(73) Assignee: Google LLC, Mountain View, CA (US)

( * ) Notice: Subject to any disclaimer, the term of this patent is extended or adjusted under 35 U.S.C. 154(b) by 778 days.

(21) Appl. No.: 15/343,469

(22) Filed: Nov. 4, 2016

(65) Prior Publication Data

US 2017/0053327 A1    Feb. 23, 2017

Related U.S. Application Data

(63) Continuation of application No. 13/410,688, filed on Mar. 2, 2012, now Pat. No. 9,514,462.

(51) Int. Cl.
*G06Q 30/00* (2012.01)
*G06Q 30/06* (2012.01)
*G06F 21/10* (2013.01)

(52) U.S. Cl.
CPC ......... *G06Q 30/0601* (2013.01); *G06F 21/10* (2013.01); *G06Q 30/00* (2013.01); *G06Q 2220/18* (2013.01)

(58) Field of Classification Search
CPC .............................................. G06Q 30/00–08
See application file for complete search history.

(56) References Cited

U.S. PATENT DOCUMENTS

| 9,514,462 B2 | 12/2016 | Murray |
| 2002/0082997 A1 | 6/2002 | Kobata et al. |
| 2006/0140180 A1 | 6/2006 | Du Breuil |

(Continued)

FOREIGN PATENT DOCUMENTS

| CN | 101216871 | 7/2008 |
| CN | 101477669 | 7/2009 |

(Continued)

OTHER PUBLICATIONS

International Preliminary Report on Patentability in International Application No. PCT/US2013/028524, dated Sep. 2, 2014, 8 pages.

(Continued)

*Primary Examiner* — Michael Misiaszek
(74) *Attorney, Agent, or Firm* — Shumaker & Sieffert, P.A.

(57) ABSTRACT

In one implementation, a computer-implemented method includes receiving, at a computing device and from a computer server system, digital content that is for sale and that is received without having yet been purchased by a user of the computing device; storing the digital content locally on the computing device in a manner that prohibits user access to the digital content; after storing the digital content: receiving user input that indicates the user is purchasing at least a portion of the stored digital content; and in response to the received user input, storing information that indicates the user purchased the portion of the digital content and providing the user with access to the purchased portion of the digital content; and in response to detecting that the computing device is communicatively connected to the computer server system over a network, providing the stored information to the computer server system.

20 Claims, 7 Drawing Sheets

(56) References Cited

U.S. PATENT DOCUMENTS

| | | | |
|---|---|---|---|
| 2006/0155989 A1* | 7/2006 | Nishimoto | H04N 5/913 713/166 |
| 2008/0082688 A1 | 4/2008 | Yi et al. | |
| 2008/0140442 A1 | 6/2008 | Warner | |
| 2008/0262922 A1 | 10/2008 | Ahn et al. | |
| 2009/0222117 A1 | 9/2009 | Kaplan et al. | |
| 2009/0240696 A1 | 9/2009 | Van Gassel et al. | |
| 2010/0036748 A1 | 2/2010 | Siegel et al. | |
| 2010/0146601 A1 | 6/2010 | Bunch et al. | |
| 2011/0099156 A1 | 4/2011 | Libin et al. | |
| 2011/0314378 A1 | 12/2011 | Nijim et al. | |
| 2012/0078708 A1 | 3/2012 | Taylor et al. | |
| 2012/0260347 A1* | 10/2012 | Whitfield, Jr. | G06F 21/10 726/26 |
| 2013/0024633 A1 | 1/2013 | Maurer | |
| 2013/0179281 A1 | 7/2013 | White et al. | |

FOREIGN PATENT DOCUMENTS

| | | |
|---|---|---|
| CN | 101833820 | 9/2010 |
| CN | 101957963 | 1/2011 |
| WO | 2009/144688 | 12/2009 |

OTHER PUBLICATIONS

Extended European Search Report issued in European Application No. 13711193.6 dated Sep. 30, 2015, 6 pages.

Office Action in Chinese Application No. 201380021329.x, dated Nov. 30, 2016, 12 pages.

"The Pull of Push VOD" *3 Vision* (2011) 2 pages.

News Blaze Safari Books Online Launches Free Global iPad App called 'Safari to Go' [retrieved on Jan. 19, 2011] Retrieved from the Internet: http://newsblaze.com/story/20101110409382500002.bw/topstory.hmtl .2 pages. (Nov. 4, 2010).

International Search Report and Written Opinion in International Application No. PCT/US2013/028524, dated Dec. 12, 2013, 11 pages.

Viaccess "Push VOD" (Dec. 2009) 2 pages.

Office Action issued in European Application No. 13711193.6, dated Sep. 28, 2017, 8 pages.

Wee. "Analysis of hidden data in NTFS file system," Edith Cowan University, Jan. 31, 2006, 21 pages.

'stackoverflow.com' [online] "javascript—User authentication in offline web apps—Stack Overflow," Oct. 24, 2011, [retrieved on Sep. 12, 2017], Retrieved from Internet: URL<https://stackoverflow.com/questions/7879641/user-authentication-in-offline-web-apps/7879736#7879736> 2 pages.

Response to the Communication pursuant to Rules 70(2) and 70a(2) EPC from counterpart EP Application No. 13711193.6 dated Oct. 16, 2015 , filed Apr. 25, 2016, 20 pgs.

Notification and translation thereof of the Grant of Patent from counterpart CN Application No. 201380021329A dated Aug. 8, 2017, 4 pgs.

Prosecution history for U.S. Appl. No. 13/410,688 dated May 23, 2014 through Aug. 3, 2016, 72 pgs.

* cited by examiner

CONTENT PURCHASING

CROSS-REFERENCE TO RELATED APPLICATIONS

This application is a continuation application of and claims priority to U.S. application Ser. No. 13/410,688, filed on Mar. 2, 2012, the entire contents of which are hereby incorporated by reference.

TECHNICAL FIELD

This document generally describes content purchasing on a computing device.

BACKGROUND

A variety of services have been created to allow users to purchase and download media content (e.g., digital books, music, digital articles, digital magazines, and/or videos) onto their computing devices, such as smartphones, media players (e.g., music players, digital e-book readers), tablet computing devices, and/or other computer devices (e.g., desktop computers, laptop computers). For instance, users can purchase and download digital music files on-demand from one or more online music stores, such as APPLE's ITUNES STORE and GOOGLE MUSIC.

For example, a user can provide a request for digital music files with payment information (e.g., user account identifier, credit card information) over one or more networks (e.g., the Internet) to a computer server system implementing a music store. The computer server system can process the payment information (e.g., charge a user's account/credit card) and, if the payment clears, can provide the requested music files to the user's computing device, which can locally store and provide access to the requested music files.

SUMMARY

Content purchasing on a computing device can be provided by prospectively loading unpurchased content, such as media content (e.g., electronic books, digital music, digital videos, digital articles, digital magazines), software (e.g., mobile device applications, software upgrades/add-ins), and/or application content (e.g., new levels for a game), onto a user's computing device when the computing device has network connectivity. Unpurchased content can be stored locally on a user's computing device in a manner that obfuscates and/or makes the unpurchased content inaccessible to a user of the computing device. Unpurchased content can be locally purchased and made accessible on a computing device without purchase information (e.g., user account identifier, credit card information) first having been processed and/or cleared by a computer system providing the unpurchased content, such as when the computing device is unable to communicate with the computer system over one or more networks (e.g., the computing device is not connected to the Internet, the computer system is offline, the computing device has a restricted/limited connection to the Internet). Purchase information can be locally stored and provided once communication with the computer system is established.

For example, a user's mobile computing device can be loaded with new and unpurchased music, movies, and/or electronic books while the computing device is idle and is able to communicate with a content server system over one or more networks (e.g., wireless network, local area network (LAN), the Internet). This unpurchased content can then be locally purchased and made accessible on the computing device regardless of whether the computing device is able to communicate with the content server system. For example, the user can purchase and access the unpurchased content when the computing device is without an Internet connection, such as when the computing device is in "airplane mode" with its wireless transceiver turned off. In another example, the user can have instantaneous access to the unpurchased content (and can avoid having to wait for the unpurchased content to download to the computing device) by purchasing the content even when the computing device is able to communicate with the content server system. Purchase information, such as information identifying the content that is being purchased and a specific source for payment, can be provided to the content server system when the computing device is next able to communicate with the content server system (e.g., Internet connection is reestablished).

In one implementation, a computer-implemented method includes receiving, at a computing device and from a computer server system, digital content that is for sale and that is received without having yet been purchased by a user of the computing device; storing the digital content locally on the computing device in a manner that prohibits user access to the digital content; after storing the digital content on the computing device and while the computing device is not communicatively connected to the computer server system: receiving user input that indicates the user is purchasing at least a portion of the stored digital content; and in response to the received user input, storing information that indicates the user purchased the portion of the digital content and providing the user with access to the purchased portion of the digital content; and in response to detecting that the computing device is communicatively connected to the computer server system over a network, providing the stored information to the computer server system.

In another implementation, a computer-implemented method includes receiving, at a computer server system and from a computing device, a request for digital content that is for sale; identifying digital content to provide to the device; providing the identified digital content to the device before the content has been purchased by a user of the computing device, wherein full copies of the digital content are provided to the computing device and stored locally on the computing device; receiving information that indicates that the user purchased at least a portion of the digital content while the computing device was offline, wherein when the information is received by the computer server system the user has already had access to the portion of the digital content on the computing device; and in response to receiving the information, processing a financial transaction between the user and a party selling the portion of the digital content.

In another implementation, a system includes a mobile computing device; an interface of the mobile computing device to receive, from a computer server system, digital content that is for sale and that is received without having yet been purchased by a user of the computing device; a file system of the mobile computing device arranged to store the digital content locally on the mobile computing device in a manner that prohibits user access to the digital content; and an access module of the mobile computing device to, while the mobile computing device is not communicatively connectable to the computer server system, i) receive user input that indicates the user is purchasing at least a portion of the stored digital content, ii) store purchase information that indicates the user purchased the portion of the digital content, iii) provide the user with access to the purchased portion of the digital content, and iv) provide the stored purchase information to the computer server system in response to detecting that the mobile computing device has become communicatively connected to the computer server system over a network.

The details of one or more embodiments are set forth in the accompanying drawings and the description below. Various advantages can be provided by the disclosed systems and methods. For example, users can purchase and have access to new content even when their computing devices are not able to communicate with a computer system that provides content for sale. In another example, new content can be quickly and readily made accessible on a computing device without the download lag associated with on-demand services. For instance, even when a computing device is able to communicate with a content provider over one or more networks, the computing device can have instantaneous and download delay-free access to new content that was previously loaded onto the computing device as unpurchased content.

In another example, content providers can reach a temporary and ever-changing segment of the market that was previously inaccessible—users who are temporarily without an Internet connection. For instance, users typically do not have access to the Internet for the duration of their airplane flights. If such a user were to want to purchase new content (e.g., music, electronic books, videos) during his/her flight, he/she would typically be unable to do so. However, content providers can reach such a market by providing unpurchased content to users' computing devices and by allowing users to purchase and access such content at their leisure, such as when the users are without an Internet connection on an airplane flight.

In a further example, content providers can be protected from piracy and other misappropriation of unpurchased content through the use of countermeasures to obfuscate and/or to make unpurchased content inaccessible to users. As described in greater detail below, a variety of countermeasures can be used, such as encryption, file segmentation, using hidden file names, and/or marking storage locations at which unpurchased content is being stored as free.

In another example, aggregate network traffic during peak use hours can be decreased. For instance, unpurchased content can be provided to computing devices when there is at least a threshold amount of network bandwidth available for communicating with the computing devices. By providing content to computing devices during periods of low network usage (e.g., during the early hours of the morning) content downloads during periods of potentially high network usage (e.g., during the day and evening) can be decreased. Some content, such as movies, can include a large amount of data (e.g., gigabytes of data) that is transferred to computing devices when purchased. By shifting the time at which such content is provided to computing devices, network strain during peak hours can be decreased.

In a further example, a computer system can "put off" transactions until a future time to free up current processing cycles for other tasks, such as other transactions that are more time-sensitive or urgent. The volume of transaction requests that are received by a computer system can vary over time. To accommodate all client requests during periods of high volume with a threshold level of latency/delay or less, a computer system can delay settling some transactions until a later time, such a time when the computer system has a low volume of transaction requests. For instance, on a day when a computer system is experiencing a high volume of transaction requests, such as reseller may experience during a limited time sale (e.g., "Black Friday" in the United States), the computer system can identify some transactions for settlement in the future even though client computing devices for the transactions are online at the time. Transactions identified for future processing can include transactions for digital content that was previously provided to client computing devices, whereas a computer system can proceed to process other transactions that may need to be immediately fulfilled, such as transactions for physical goods.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
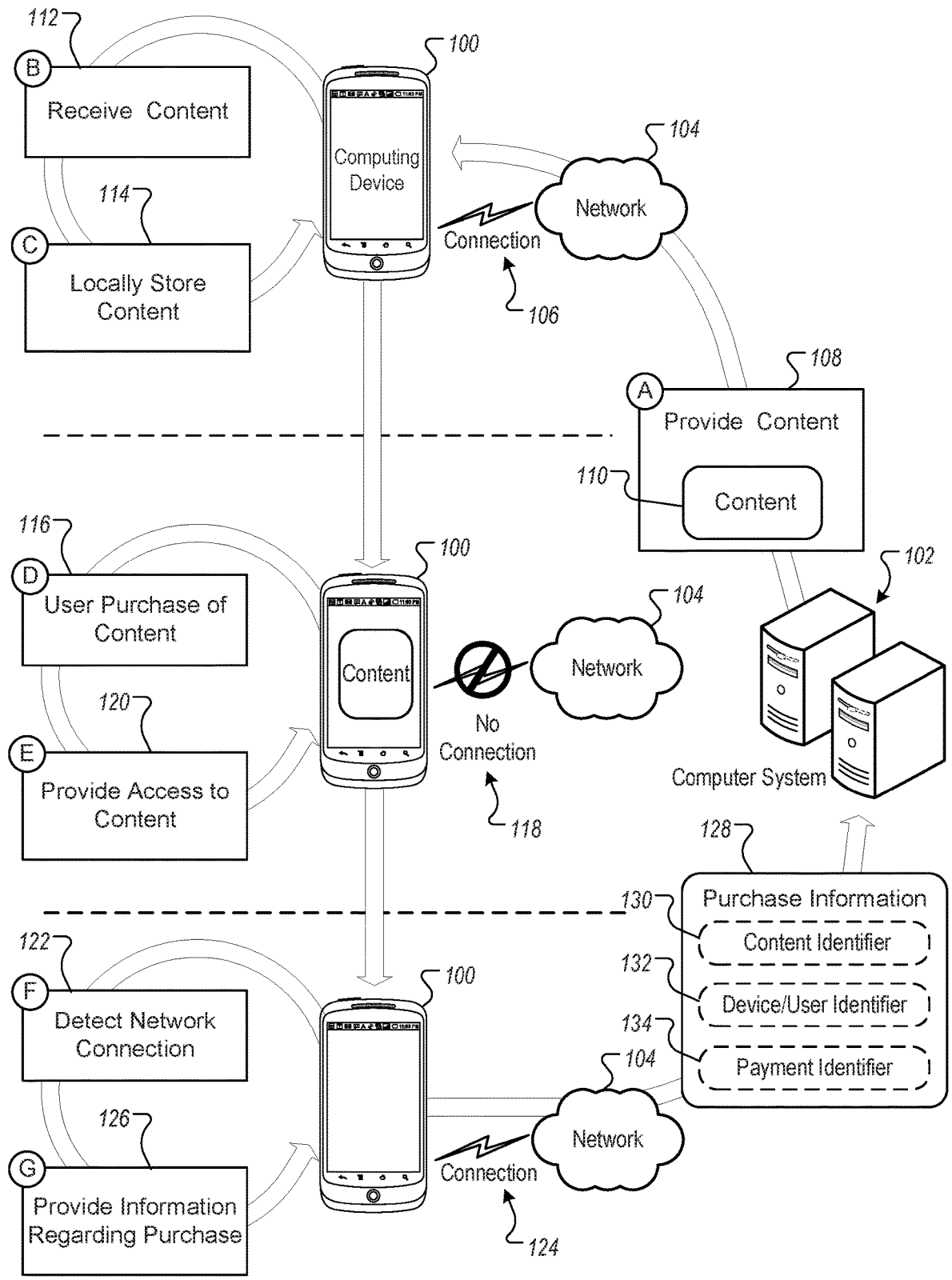
FIG. 1 is a conceptual diagram that depicts an example of unpurchased content being provided to and purchased on a computing device by a computer system.

Unpurchased content, such as media content (e.g., electronic books, digital music, digital videos, digital articles, digital magazines), software (e.g., mobile device applications, software upgrades/add-ins), and/or application content (e.g., new levels for a game), can be provided to computing devices prospectively when the computing devices are able to communicate with one or more content providers over one or more networks (e.g., wireless networks, the Internet). Such unpurchased content can be stored locally on computing devices and can be purchased by users of the computing devices regardless of whether or not the computing devices are able to communicate with a content provider at the time of purchase. Purchase information, such as an identifier for the content that is being purchased and/or payment information (e.g., credit card number, user account identifier), can be stored locally on a computing device and provided to a content provider when communication with the content provider is re-established over one or more networks.

For example, a user's a smartphone (an example computing device) can provide a request for new and unpurchased media content (e.g., new electronic books and digital music) to a media content provider system when the smartphone is idle. In response, the smartphone can download and locally store unpurchased media content from the media content provider system. A user of the smartphone can instantaneously access this locally stored media content by purchasing it on the smartphone. Purchase information (e.g., credit card information, user account identifier) can be provided to a media content provider system when the smartphone is able to communicate with the media content provider system, which may be at a time when the media content is purchased or at a later time.

By loading unpurchased content onto a user's computing device, the user can have access to new content regardless of whether the computing device is able to communicate with content providers. Additionally, a user can obtain instantaneous access to loaded content once it has been purchased based on the content being stored locally on the user's computing device prior to the time of purchase. Given the size of some content, such as movies which can include several gigabytes of data, being able to access (e.g., play) content instantly without having to first wait for it to be downloaded can be beneficial.

A time at when new unpurchased content is downloaded to a user's computing device can vary. In some implementations, a computing device can provide a request for new and unpurchased content to one or more content provider systems and can receive such content in response. For example, a computing device can be configured to request new and unpurchased content once over a period of time (e.g., once a week, once a month, once every two months) when the computing device is idle (e.g., not being actively used by a user). In another example, a computing device may be configured to request new and unpurchased content when instructed to do so by a user of the computing device (e.g., user requests that a selection of unpurchased content be downloaded in advance of a particular date). In some implementations, a content provider system can periodically ping a computing device to ask whether the computing device would like additional unpurchased content.

In response to receiving a request for unpurchased content, a content provider system can determine whether or not to provide such content to a particular user and/or to the user's computing device. Providing unpurchased content may be viewed as a loan and a content provider system may want to only provide content to a trustworthy user and/or computing device in advance of the content being purchased. Such a determination can be based on a variety of factors, such as a user's and/or device's history with regard to other unpurchased content, a number of completed online transactions that are associated with a user and/or a computing device, a number of refunds requested and/or processed in association with a user and/or computing device, a number of times that a media client application has been activated and/or deactivated (e.g., number of times a user purchased and subsequently uninstalled content before a transaction was processed), whether a computing device is or is not in an unlocked state, and/or whether media client applications are in known good states and/or states that do not permit them or the content they render to be subverted.

Content can be selected for a particular user and/or computing device based on a variety of factors. For instance, a request for content may not specify the type of content that is being requested. A content provider system can make such determinations based on a variety of factors, such as currently popular titles, previous content purchased by a user, content that users have added to a "wish list" (e.g., content that users have indicated they are interested in purchasing at a future date and/or receiving as gifts from others), samples of content that users have previewed (e.g., samples of e-books that users have added to their digital libraries, movie trailers that users have watched), media accessed by a user on third-party websites (e.g., videos viewed on website providing video content, music listened to using an online streaming music service, articles read on a news aggregator website, content viewed on a social network, movie trailers users have watched), content recommended by a user's friends (e.g., content recommended in association with a social network), and/or currently popular titles with other similar users (e.g., other users geographically located near a user, other users of the same or similar age).

A user may provide permission for some information regarding the content on the user's computing device (e.g., identifiers for albums that the user owns, identifiers of applications that are installed on the user's computing device) and/or its use by the user (e.g., the user listens to jazz more than any other type of music, the user spends most of his/her time on the computing device using a particular application) to be provided to a content provider system. Such information can be used by a content provider system to identify content that would be "new" to the user (not already owned by the user) and/or to identify content in which the user is likely to be interested.

Unpurchased content can be stored locally on a computing device so as to obfuscate and/or render the unpurchased content inaccessible to a user of the computing device. For example, a computing device can segment unpurchased content into a plurality of portions which are stored separately in the computing device's file system. In another example, a computing device can encrypt unpurchased content. In a further example, a computing device can mark storage locations at which unpurchased content is being stored as "free"—meaning that it can be allocated by the file system if needed. In another example, a computing device can store unpurchased content as hidden files (e.g., file names starting with a "."). Various combinations of these or other techniques for locally storing unpurchased content can be used.

Various mechanisms can be used to protect user privacy. For example, information that would otherwise provide the identity of a user can be anonymized when possible. For instance, when attempting to identify current popular content, the identity of other users who purchased content can be made anonymous. In another example, the features discussed in this document can be opt-in features that require user consent, such as providing unpurchased content to a user's computing device.

FIG. 1 is a conceptual diagram that depicts an example of unpurchased content being provided to and purchased on a computing device 100 by a computer system 102. In the depicted example, the mobile computing device 100 receives unpurchased content while the mobile computing device 100 has network connectivity, the user purchases and accesses the content when the device 100 has no/limited network connectivity, and the device 100 provides purchase information to the computer system 102 when the device 100 has network connectivity again.

The computing device 100 can be any of a variety of appropriate computing devices, such as smartphones, tablet computing devices, e-book readers, personal digital assistants (PDA), laptop computers, netbooks, desktop computers, and/or cellular telephones. The computer system 102 can be any of a variety of appropriate computer system, such as a computer server system (e.g., distributed system of computer servers), a desktop computer, a laptop computer, and/or a cloud computing system.

As indicated by a connection 106 to the network 104, the computing device 100 is connected to the network 104 and, through this connection, is able to communicate with the computer system 102. The network 104 can be any of a variety of appropriate computer networks, such as a wireless network (e.g., wifi network, 3G/4G network, Bluetooth connection), a LAN, a wide area network (WAN), a virtual private network (VPN), the Internet, a fiber optic network, or any combination thereof.

As indicated by step A (108), the computer system 102 provides unpurchased content 110 to the computing device 100 over the network 104 using one or more communication protocols (e.g., file transfer protocol (FTP), transmission control protocol (TCP), internet protocol (IP). The unpurchased content 110 can be any of a variety of appropriate content, such as digital music (e.g., MP3 files, WAV files, AAC files), electronic books (e.g., PDF files, AMAZON KINDLE files, EPUB files), digital videos (e.g., movies, user-generated videos, MPEG/MPEG-2 video files), software (e.g., mobile device applications, software upgrades, software add-ins), and/or application content (e.g., new levels of a game, templates, macros). The unpurchased content 110 can be provided to the computing device 100 in response to a request from the computing device 100, as described in greater detail with regard to FIG. 2. The unpurchased content 110 can be selected based on a variety of factors, such as content that is popular with other users and/or preferences expressed and/or implied by a user of the computing device 100, as described in greater detail below with regard to FIG. 2.

The computing device 100 can receive the content form the computer system 102 (step B 112) and can store the content locally in a storage system of the computing device 100 (step C 114). The content 110 can be stored in a manner that obfuscates the content 110 and/or makes the content 110 inaccessible to a user of the computing device 100 (e.g., not visible to a file browser application and/or usable by a media player application). As described in greater detail with regard to FIG. 3, a variety of techniques can be used to hide the content 110, such as encryption, file segmentation, file naming conventions, and/or releasing the memory locations at which the content 110 is being locally stored.

After the content 110 has been received and stored locally on the computing device 100, the user of the computing device 100 may indicate that he/she wants to purchase the content 110 (step D 116). For example, the computing device 100 can be configured to provide a user interface (e.g., touchscreen user interface, graphical user interface, voice controlled user interface) through which a user can select an option to purchase the content 110. In this particular example, when the indication that the user desires to purchase the content is received by the computing device 100, the computing device 100 is no longer connected to the network 104, as indicated by the graphic 118. For example, the computing device 100 may have moved from an area where the network 104 is accessible another location (e.g., on an airplane in-flight) where the network 104 is not accessible.

To purchase the content 110, the user of the computing device 100 may provide a variety of information to the computing device 100, such as payment information (e.g., credit card information, payment account identifier). The user may already have an account associated with the computing device 100 to which the purchase of the content 110 can be charged. In such instances, the user may be requested to provide confirmation of the purchase (e.g., confirm the purchase amount) and/or verification of the user's identity (e.g., request that the user enter username and/or password). Payment information and any other confidential/sensitive information can be stored in a secure manner on the computing device 100 when the computing device 100 is not connected to the network 104. For example, the computing device 100 can use a public key provided by the computer system 102 to encrypt and store such confidential/sensitive information. The computer system 102 can have the corresponding private key, which can be used to decrypt the payment information so as to charge the user for the purchased content.

In some implementations, the computing device 100 may not obtain and/or store payment information from a user when the computing device 100 has a token from the computer system 102 that indicates that the computer system 102 has a known good payment mechanism for the user on file. For example, a user of the computing device 100 may have stored payment information on the computer system 102 in association with a user account. After verifying the payment information (e.g., processing a transaction using the payment information, verifying the payment information with a corresponding financial institution), the computer system 102 can provide the computing device 100 with a token (e.g., file, data) that indicates to the computing device 100 that payment information has already been obtained for the user. In the absence of such a token, the computing device 100 can obtain payment information from a user as described above.

Once the user has provided sufficient information to purchase the content 110 (or some portion thereof), the computing device 100 can provide access to the purchased portion of the content (step E 120). Providing access can include moving the purchased portion of the content 110 into normal storage on the computing device 100 (e.g., making the purchased content visible in the file system of the computing device 100). For example, if the content 110 was initially stored in segments in the computing device 100, access can be provided by combining the segments of the content and storing the content in its original/native form on the computing device 100. Various applications can be provided with access to the purchase portion of the content, such as a video player application, an e-book reader application, and/or a music player application.

The computing device 100 does not have to be disconnected from the network 104 for the content to be purchased (step D 116) or for access to the content to be provided (step E 120). The disconnection (118) to the network 104 is merely provided as an illustration that new and unpurchased content can be purchased and accessed on the computing device 100 even though a network connection, such as a connection to the network 104, is not available. The steps D (116) and E (120) can be performed when the computing device 100 is connected to the network 104 and/or another network.

Additionally, the presence of the network 104 and/or the connection to the computer system 102 through the network 104 at a given time does not imply that a transaction purchasing content is processed by the computer system 102 at that time. Instead, the computer system 102 may instruct the computing device 100 to locally handle a transaction and postpone settlement of the transaction by the computer system 102 until a later time. For example, if the computer system 102 is experiencing a high volume of transaction requests, the computer system 102 may postpone settling some transactions that are possible to postpone, such as transactions for pre-loaded content. In another example, the computing device 100 may be able to detect that the computer system 102 is experiencing a high volume of requests and may unilaterally decide to postpone processing of a transaction in response. For instance, if the computing device 100 experiences at least a threshold delay while communicating with the computer system 102, such as while attempting to settle a transaction, the computing device 100 can locally handle the transaction and can attempt to settle the transaction with the computer system 102 at a later time.

In another example, the computing device 100 can request particular content from the computer system 102 through the network 104 and the computer system 102 can provide the particular content without first processing a payment for the content. The computer system 102 may limit providing such unpurchased content to instances where the computing device 100 and/or a user of the computing device 100 are determined to have at least a threshold level of trustworthiness (e.g., repeat customer with previous transaction that were successfully processed, customer with verified purchase information on file). The computer system 102 can provide the unpurchased content to the computing device 100 even if the computer system 102 is having difficulty and/or slow to process transactions, thus allowing a user to purchase content regardless of the state of the computer system 102.

Referring back to the example depicted in FIG. 1, a network connection can be detected (step F 122) and information regarding the purchase of at least a portion of the content 110 can be provided to the computer system 102 (step G 126). For instance, the computing device 100 can establish a connection 124 with the network 104. This connection 124 can be detected and can cause the information regarding the purchase to be provided to the computer system 102. The computing device 100 can provide purchase information 128 to the computer system 102. The purchase information 128 can include a variety of information to identify a purchaser, the item being purchased, and a method of payment for the purchase. For example, the purchase information can include one or more of: a content identifier 130 (e.g., serial number for the content, unique identifier) to identify the one or more portions of the content 110 that were purchased on the computing device 100, a device/user identifier 132 (e.g., username, MAC address) to identify the purchaser and/or purchasing device, and/or a payment identifier 134 (e.g., credit card information, user payment account identifier) to provide a method of payment for the purchase.

The computer system 102 can process the purchase information 128 and can provide a response to the computing device 100 that indicates whether or not the payment was successful. If the payment was successful, the computer system 102 can provide verification that the payment was successful, which can permit the computing device 100 to continue using the purchased content unimpeded. If the payment was unsuccessful (e.g., fake credit card number provided in the purchase information 128), the computer system 102 can provide an indication of the unsuccessful payment to the computing device 100, which can cause the computing device 100 to prompt the user for different/supplemental payment information, to re-hide the content 110, and/or to delete the purchased content from the computing device 100.

The computing device 100 may also be configured to delete and/or restrict access (e.g., re-hide the content 110) to purchased content for which the payment has not been processed within a threshold amount of time (e.g., one day, one week, one month) of the initial purchase at step D (116). For example, if a user were to purchase content while the computing device 100 is offline (e.g., not connected to the network 104) and not reconnect to the network 104 for over a month, the computing device 100 may delete/restrict access to the purchased content that the user has been able to access over the past month. In some implementations, the user may be provided the opportunity to either connect the device 100 to a network or to manually enter a code verifying payment for the purchased content before the purchased content is deleted/restricted.

Figure 2:
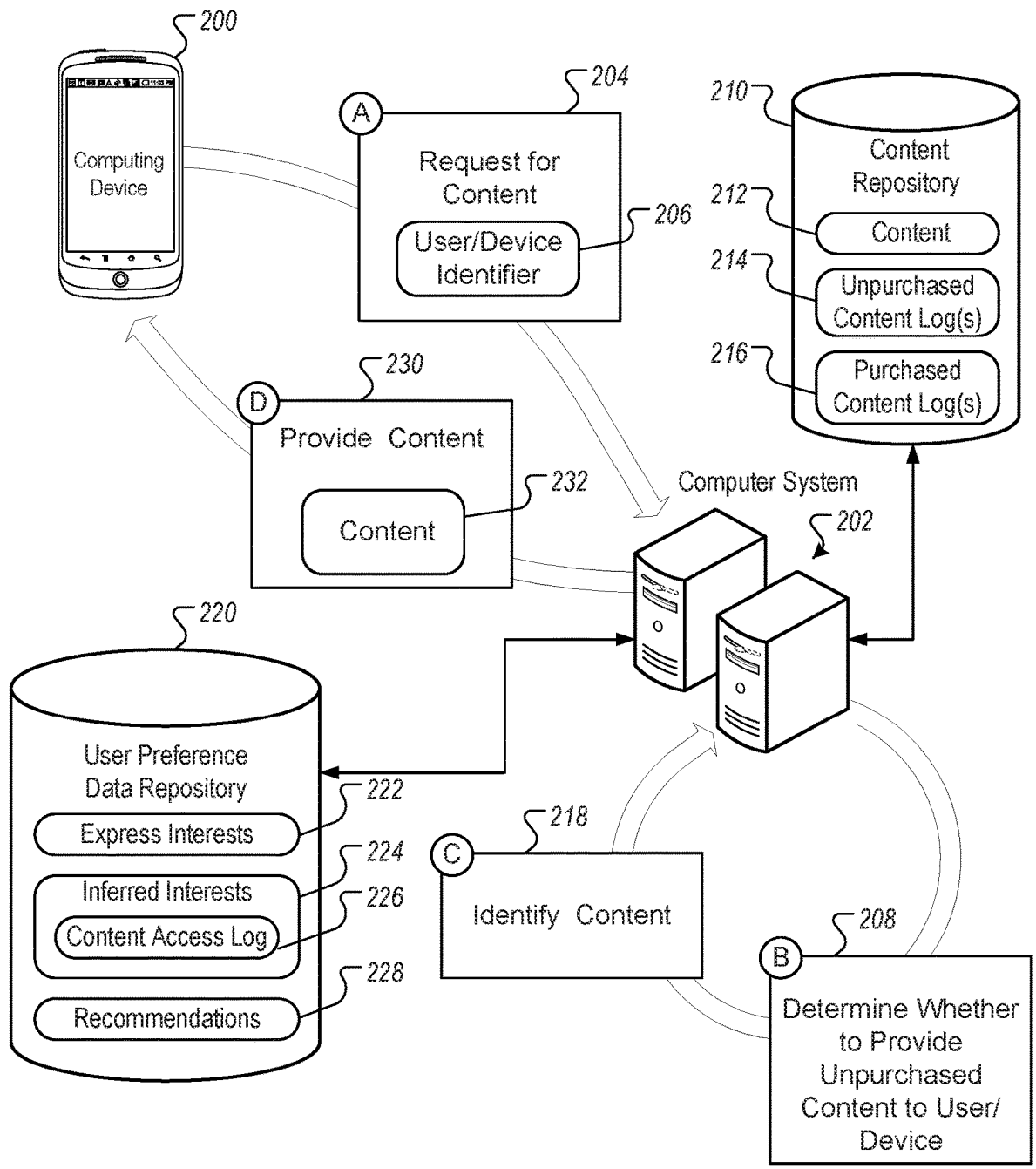
FIG. 2 is a conceptual diagram that depicts an example of unpurchased content being identified and provided to a computing device by a computer system.

FIG. 2 is a conceptual diagram that depicts an example of unpurchased content being identified and provided to a computing device 200 by a computer system 202. The example depicted in FIG. 2 depicts some features that can occur prior to step A (108), such as determining whether to provide the computing device 200 with unpurchased content and identifying content to provide to the computing device 200. The computing device 200 can be similar to the computing device 100 described above with regard to FIG. 1. The computer system 202 can be similar to the computer system 102 described above with regard to FIG. 1.

The computing device 200 can provide a request for unpurchased content to the computer system 202 (step A 204). Such a request can include information that identifies the computing device itself 200 and/or a user associated with the computing device 200, such as the user/device identifier 206. Such a request may also include information that identifies a type of content that is being requested, such a genre of movie. However, the request can be unspecific in the sense that it does not identify a specific title that is being requested. The request may also include information that identifies at least some of the content that is already stored on the computing device 200, so that duplicate content is not being provided by the computer system 202. In some implementations, the information identifying the content on the computing device 200 and/or the information identifying a preferred type of content may already be stored by the computer system 202 (with the user's consent) and may be retrievable with the user/device identifier 206.

The computing device 200 can generate the request in a variety of ways. For instance, the computing device 200 can be configured to request new content from the computer system 202 periodically (e.g., every day, every week, every month, every six months) when the computing device 200 is idle and/or is unlikely to be used for at least a threshold amount of time (e.g., unlikely to be used for the next hour). For example, the computing device 200 may choose a time in the early morning to provide the request 204 to the computer system 202, when the device 200 is unlikely to be used for a period of time. In another example, the computing device 200 may be manually instructed by a user of the device 200 to request new content from the computer system 202.

In response to receiving the request, the computer system 202 can determine whether to provide unpurchased content to the user and/or computing device 200 (step B 208). Such a determination can be based on a variety of factors, such as information indicating whether the user has previously attempted to not pay for content provided by the computer system 202. For example, if the user of the computing device 200 had previously provided bad credit card numbers to the computer system 202 after having a threshold amount of time to access the content (e.g., access for at least one hour, 6 hours, 12 hours, one day, one week), the user may be deemed untrustworthy and can be denied future unpurchased content. In another example, if the computing device 200 has had unbroken/regular communication with the computer system 202 over one or more networks without applications being re-installed and/or the computing device 200 having been restored to its original factory settings (e.g., personal content and settings having been deleted from the computing device 200), the computing device 200 can be determined to be trustworthy and can be provided unpurchased content.

The computer system 202 can use a content repository 210 that stores content 212 (e.g., music files, e-book files, video files, software, software content) and that includes logs identifying unpurchased content that was provided to computing devices (unpurchased content log 214) and purchased content (purchased content log 216). The unpurchased content log 214 can include a list and timestamp of the unpurchased content that was provided to each computing device and/or user. The purchased content log 216 can include a list and timestamp of the content items for which payment information was successfully and unsuccessfully processed. For instance, the log 216 can indicate when users have provided valid and invalid payment information. The logs 214 and 216 can be used by the computer system 202 to determine whether to provide unpurchased content to the computing device 200. For instance, the unpurchased content logs 214 can be cross-referenced with the purchased content log 216 to determine whether a user is likely to purchase content (e.g., identify frequency of purchase), how long unpurchased content is typically with a user before it is purchased (e.g., average pendency between content being provided and purchased or deleted on the computing device 200), and/or how frequently the user provides valid payment information (e.g., ratio of valid payment information to invalid payment information).

In some implementations, the computer system 202 may require a user of the computing device 200 to establish a verified payment account with the computer system 202 before the computer system 202 will provide unpurchased content to the computing device 200. For example, the computer system 202 may require a verified credit card or bank account number to be on file in association with the computing device 200 before providing unpurchased content to the computing device 200.

After determining that the computing device 200 is to receive unpurchased content, the computer system 202 can identify content to provide to the computing device 200 (step C 218). The computer system 202 can use a variety of information to identify content to provide to the computing device 200, such as information contained in a user preference data repository 220. The user preference data repository 220 can include information 222 identifying express interests of users, such as interests that a user of the computing device 200 may have explicitly identified when setting-up an account with the computer system 202 (e.g., "I like mystery novels," "I dislike country music").

The user preference data repository 220 can also include information 224 identifying inferred interests of users which may be determined from one or more logs 226 identifying content that users have accessed from content providers. For example, the content access logs 226 can be an aggregation of a user's online and/or offline activity, such as watching videos and/or listening to music. With a user's consent, such information indicating user preference may be accessed and used to infer user interests and to identify relevant content to provide to a user. Additionally or alternatively, cross-referencing the unpurchased content log 214 and the purchased content log 216 can provide inferences as to the types of content that the user of the computing device 200 liked and didn't like, and can be used to identify additional content to provide to the computing device 200.

The user preference data repository 220 can also include information regarding recommendations 228 that users have provided to each other. For example, users on a social network may recommend content to their friends by selecting an endorsement control, such as a "like" button or a "+1" button associated with the content. In another example, users can recommend content by posting links to the content on pages of a social network. Such recommendations can be used by the computer system 202 to identify content as well.

The computer system 202 may also use information regarding popular content when identifying content to provide to the computing device 200. For instance, the computer system 202 can use the purchased content logs 216 to identify the most commonly sold content to identify content to provide to the computing device 200.

The computer system 202 can retrieve the identified content from the content repository 210 and can provide the content 232 to the computing device (step D 230), similar to the step A (108) described above with regard to FIG. 1.

Figure 3:
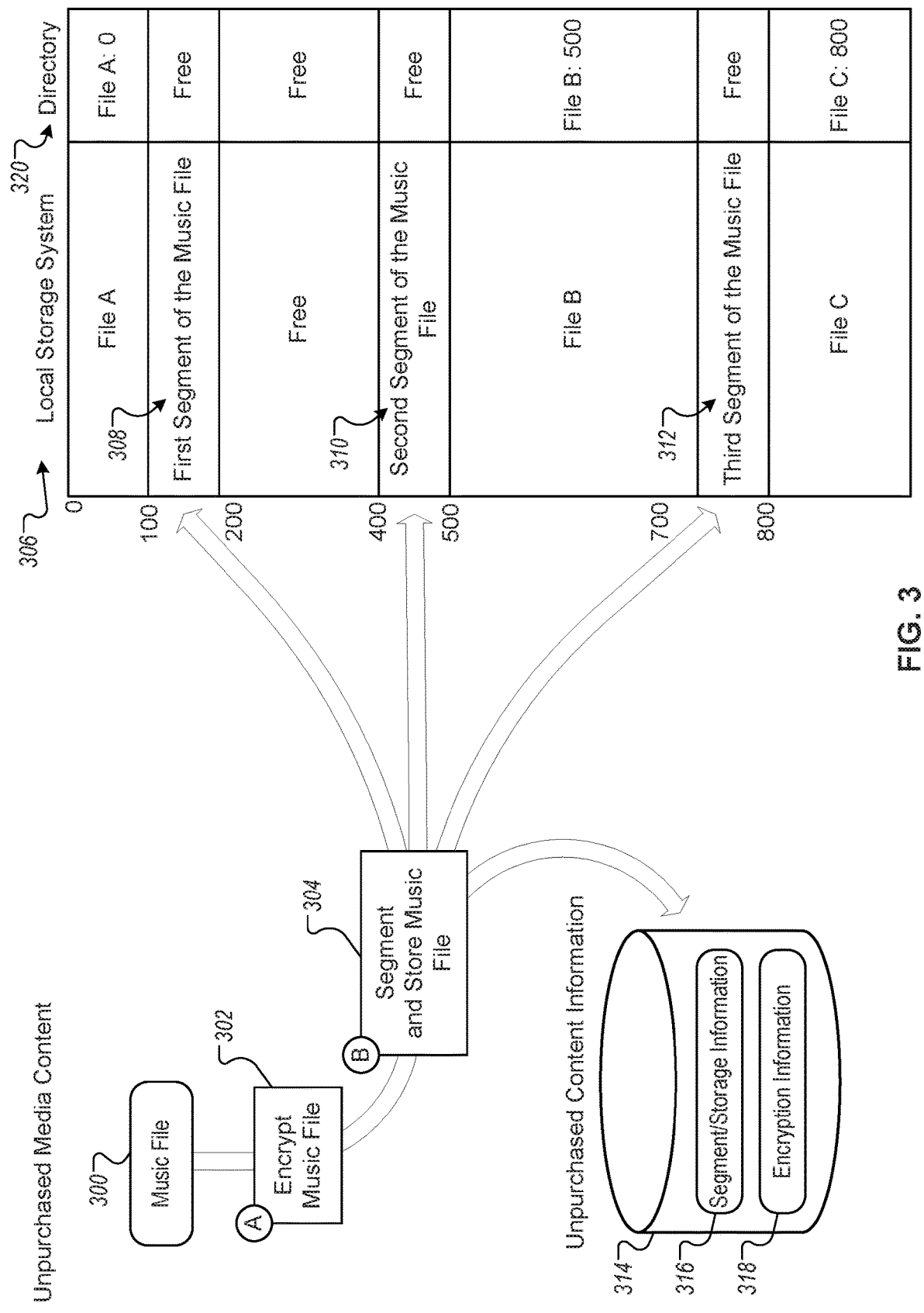
FIG. 3 is a conceptual diagram that depicts an example of local storage of unpurchased content on a computing device.

FIG. 3 is a conceptual diagram that depicts an example of local storage of unpurchased content on a computing device. FIG. 3 depicts an example technique for obfuscating and/or restricting access to unpurchased content that is being locally stored on a computing device. A music file 300 is presented as an example of unpurchased content that is being stored by a computing device, such as the computing devices 100 and 200 described above with regard to FIGS. 1 and 2, respectively.

As indicated by step A (302), the music file 300 can be encrypted. A variety of appropriate encryption techniques can be used to encrypt the music file, such as public key cryptography. Encryption will cause the data in the music file 300 to appear jumbled to a music application that attempts to play an encrypted version of the music file 300. Vulnerabilities of encryption include local storage in a computing device of a key to decipher the encrypted music file. A variety of techniques may be used to overcome this obstacle, such as using a hardware-encoded encryption technique where the key (or a technique to generate the key) is hardwired and/or storing the key in a portion of RAM that is accessible only to operating system processes.

The music file 300 can be segmented and stored in a local storage system 306 of a computing device (step B 304). The local storage system 306 can be any of a variety of appropriate storage systems, such as a hard disk drive and/or a solid state hard drive. In the present example, the music file 300 is segmented into three portions—a first segment 308, a second segment 310, and a third segment 312. Any number of segments can be used, such as two, three, four, ten, etc. In the depicted example, the segments 308-312 are stored as separate files in separate portions of the logical storage system 306.

Information that can be used to piece the unpurchased content information back together can be stored in an unpurchased content information repository 314, which can include segment/storage information 316 and/or encryption information 318. The segment/storage information 316 can indicate a variety of information regarding how the music file 300 was segmented, such as a number of segments that were used, an order of the segments, and/or addresses (logical and/or physical) for the segments in the local storage system 306. The encryption information 318 can include information identifying a type of encryption algorithm that was used and/or one or more keys that can be used to decipher the encrypted data.

The local storage system 306 can be paired with a directory/index 320 that is used by the file system to identify existing files that are stored in the local storage system 306 and to identify free storage locations where new files can be stored. As an added layer of obscurity, the portions of the local storage system 306 that are storing the unpurchased music file segments 308-312 can be designated as free— meaning that they appear to not store data that is currently being used. Such a designation can further hide the unpurchased music file 300.

Although the encryption, segmentation, and marking of storage locations as free are discussed together, any combination of these techniques can be used to obfuscate unpurchased media files on a computing device.

Figure 4:
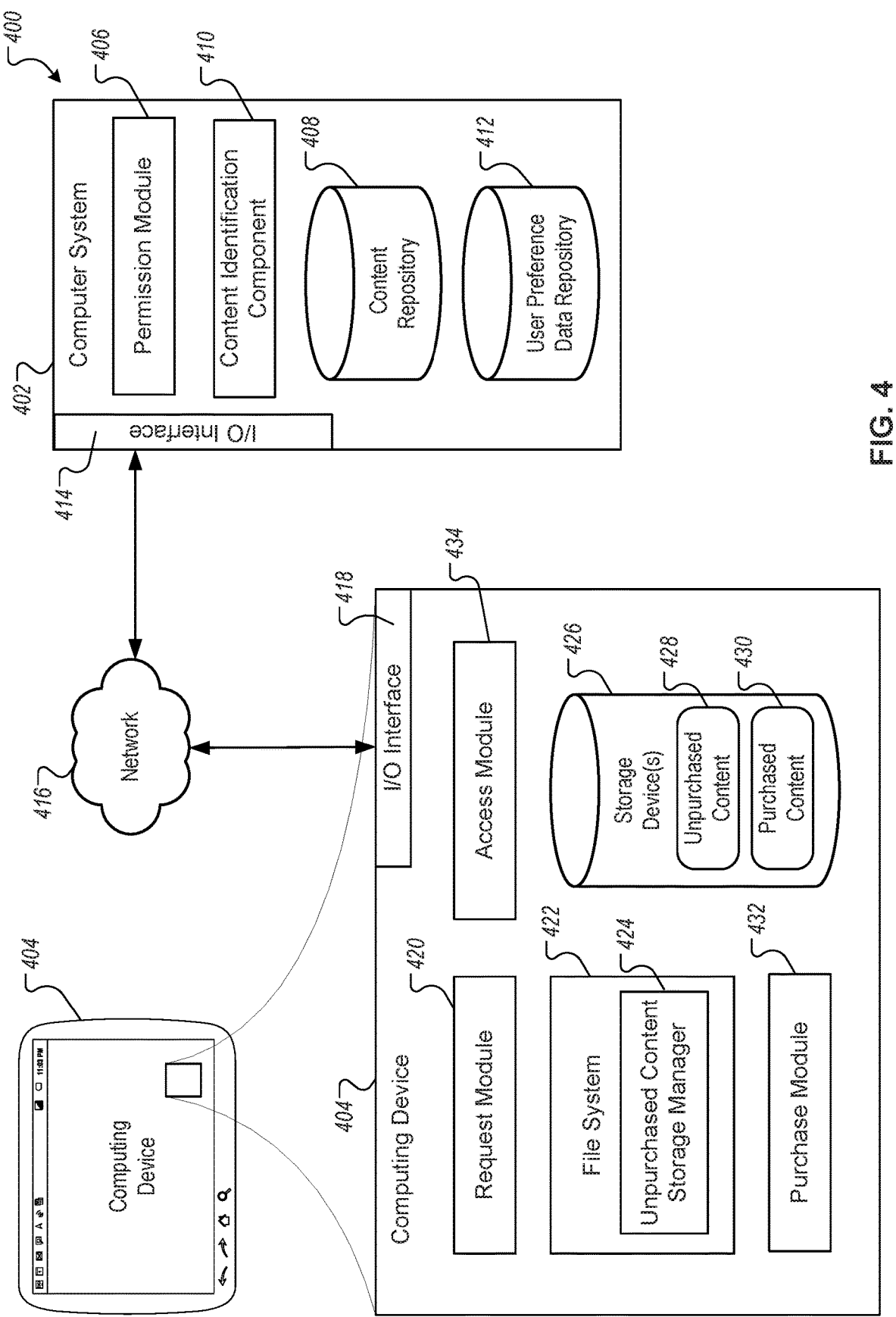
FIG. 4 is an example system that includes a computer system to provide unpurchased content to a computing device.

FIG. 4 is an example system 400 that includes a computer system 402 to provide unpurchased content to a computing device 404. The computer system 402 can be similar to the computer system 102 as described above with regard to FIG. 1 and/or the computer system 202 as described above with regard to FIG. 2. The computing device 404 can be similar to the computing device 100 described above with regard to FIG. 1 and/or the computing device 200 described above with regard to FIG. 2.

The computer system 402 includes a permission module 406 that determines whether a particular user and/or computing device, such as the computing device 404, has permission to receive unpurchased content. The permission module 406 can make such a determination based on factors similar to those discussed above with regard to step B (208) in FIG. 2. The permission module can use information stored in a content repository 408 to make such determinations as well, such as logs of unpurchased content that was provided to users and purchases of such content that were successfully and/or unsuccessfully made by users of such content. The content repository 408 can be similar to the content repository 210 discussed above with regard to FIG. 2.

The computer system 402 also includes a content identification component 410 that is configured to identify content to provide to the computing device 404. The content identification component 410 can make such an identification using the some or all of the factors discussed above with regard to step C (218) in FIG. 2. The content identification component 410 can use information stored in a user preference data repository 412 and/or information stored in a content repository 408. The user preference data repository 412 can be similar to the user preference data repository 220 discussed above with regard to FIG. 2.

The computer system 402 also includes an input/output (I/O) interface 414 that sends and receives data for the computer system 402 over a network 416. The network 416 can include one or more communications networks, such as the Internet, a wireless network, a LAN, a WAN, and/or a VPN. The computer system 402 can use the I/O interface 414 to transmit content over the network 416 to the computing device 404.

The computing device 404 includes an I/O interface 418 that sends and receives information over the network 416, such as unpurchased content provided by the computer system 402.

The computing device 404 also includes a request module 420 to manage sending requests for unpurchased content to the computer system 402. The request module 420 can determine when to provide requests to the computer system 402 similar to the determination discussed with regard to step A (204) in FIG. 2.

The computing device 404 also includes a file system 422 that manages operation (e.g., reads, writes, memory allocation requests) of one or more storage devices 426 for the computing device 404. The file system 422 includes an unpurchased content storage manager 424 that manages storage of unpurchased content in the one or more storage devices 426. For example, the unpurchased content storage manager 424 can attempt to obfuscate the location of locally stored and unpurchased content using one or more of the techniques discussed with regard to FIG. 3. The one or more storage devices 426 can store both unpurchased content 428 and purchased content 430, and can be similar to the local storage system 306 discussed above with regard to FIG. 3.

The computing device 404 can also include a purchase module 432 that manages the purchasing of content and/or reporting purchase information to the computer system 402 once a network connection allowing communication to the computer system 402 is available (e.g., the network 416). The purchase module 432 can perform operations similar to those discussed above with regard to step F (122) and step G (126) in FIG. 1. In particular, the purchase module 432 can obtain, securely store, and provide purchase information to the computer system 402 over the network 416 when a connection to the network 416 is next available, or at another time, such as a time of low activity. In response to receiving purchase information for a particular portion of the unpurchased content 428, the purchase module 432 can instruct the file system 422 and/or the unpurchased content storage manager 424 to make the purchased content fully accessible as the purchased content 430 on the computing device 404. Even after made the purchased content 430 is accessible on the computing device 404, there may be various software and/or hardware imposed restrictions on its use, such as digital rights management code.

The computing device 404 can also include an access module 434 to temporarily, and in some instances permanently, restrict and/or remove access to purchased content 430 when payment information for the purchased content 430 (which was previously the unpurchased content 428) was declined/rejected by the computer system 402. For example, if a user provides invalid payment information for the unpurchased content 428 when the computing device 404 is not connected to the network 416 and thereby obtains access to the unpurchased content 428 (e.g., the unpurchased content 428 is converted to the purchased and accessible content 430), the access module 434 can restrict access to and/or delete the improperly purchased content in response to receiving notification from the computer system 402 that the payment information was invalid.

The access module 434 can restrict and/or remove access to content that was purchased while the computing device 404 was offline (e.g., not connected to the network 416, not able to communicate with the computer system 402) in other scenarios as well. For example, if at least a threshold amount of time (e.g., 6 hours, one day, one week) has passed since the unpurchased content 428 was purchased without corresponding purchase information being provided to the computer system 402 for processing, the computing device 404 can notify the user of the need to connect the computing device 404 to the network 416 to transmit the purchase information to the computer system 402. Additionally and/or alternatively, the access module 434 can restrict access (using one or more of the techniques discussed above with regard to FIGS. 1-3) to the content until the payment information is provided to and processed by the computer system 402. The access module 434 may also delete unpurchased content 428 that has been purchased but for which the purchase information has not been processed by the computer system 402 and/or unpurchased content 428 that has been stored locally on the computing device 404 for at least a threshold amount of time (e.g., one week, one month, three months) without having been purchased by a user.

Figure 5A:
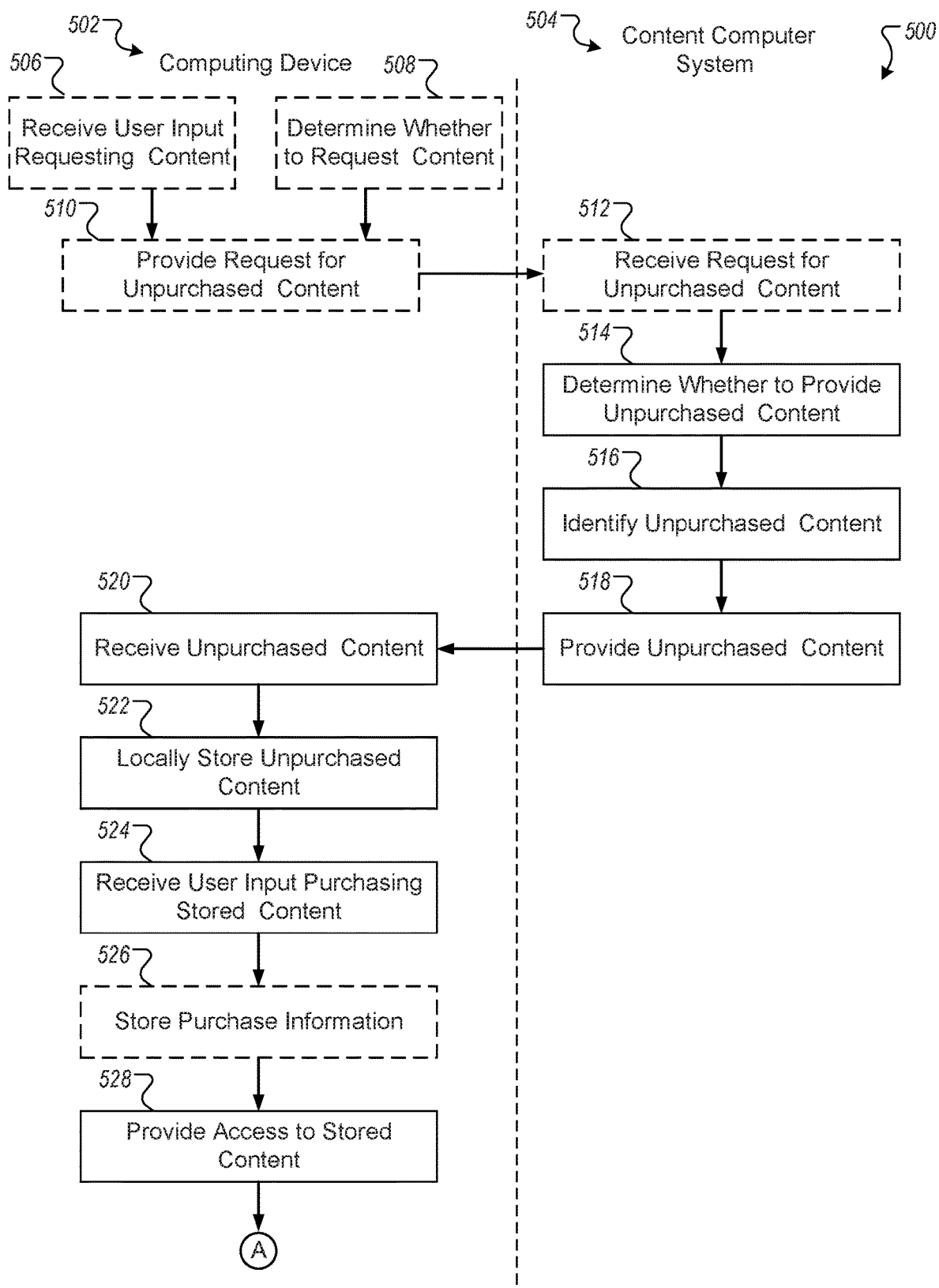
FIGS. 5A-B are flowcharts depicting an example process for providing unpurchased content to a computing device.
Figure 5B:
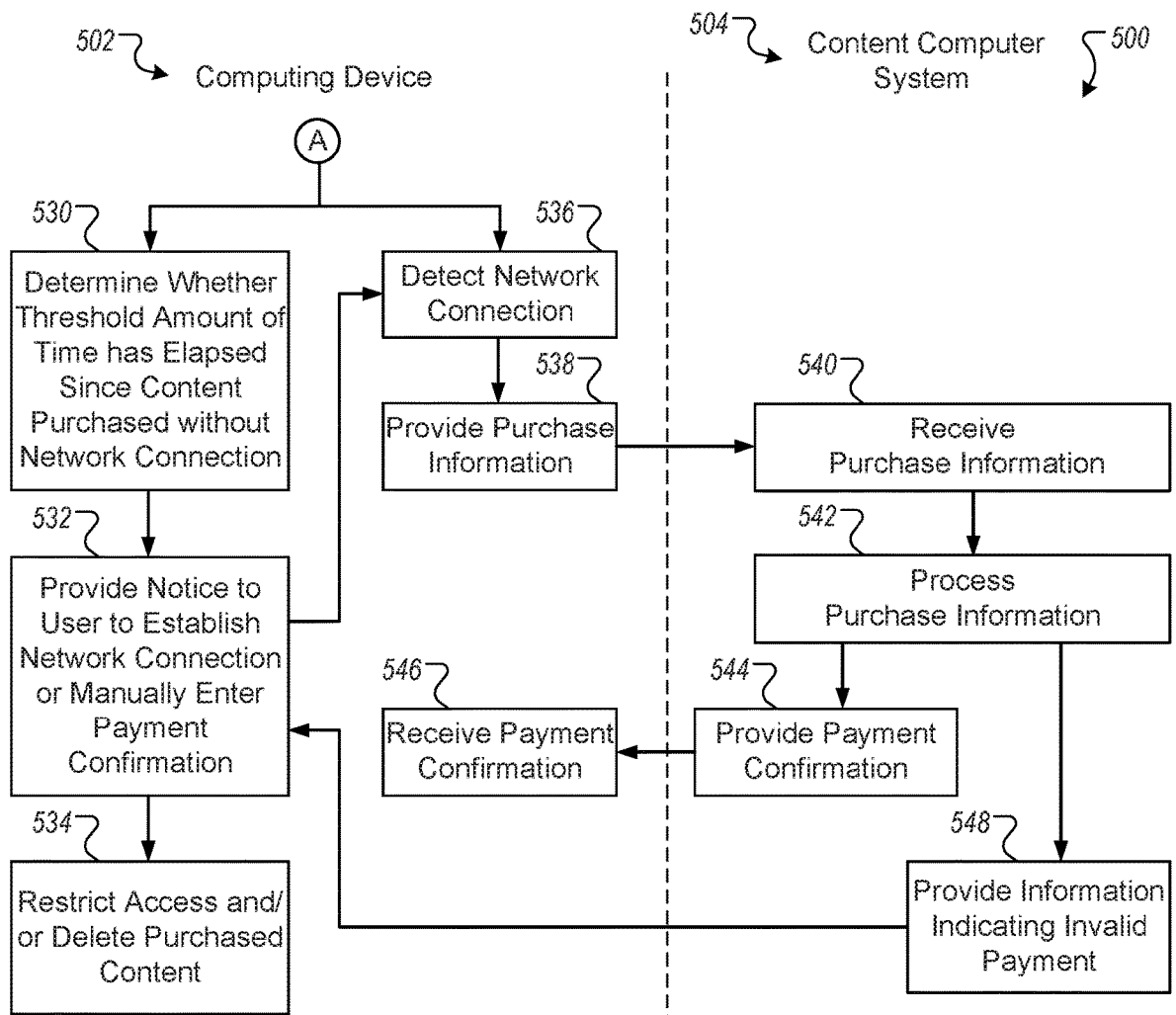

FIGS. 5A-B are flowcharts depicting an example process 500 for providing unpurchased content to a computing device 502. The process 500 can be preformed in-part by the computing device 502 and in-part by a content computer system 504. The computing device 502 can be any of a variety of appropriate computing devices, such as the computing device 100, the computing device 200, and/or the computing device 404. The content computer system 504 can be any of a variety of appropriate computer system, such as the computer system 102, the computer system 202, and/or the computer system 402.

Referring to FIG. 5A, in some implementations user input can be received at the computing device 502 and can request unpurchased content be loaded onto the computing device 502 (506). For instance, a user embarking on a trip may want to load unpurchased content onto some of the free storage space of the computing device 502 before departing for the trip. Such a user can instruct the computing device 502 through one or more input devices (e.g., touchscreen, keyboard, mouse, track pad/ball, microphone) to obtain unpurchased content from the content computer system 504. In such implementations, the computing device 502 can provide a request for unpurchased content to the content computer system 504 (510), similar to the request 204 discussed with regard to FIG. 2.

In some implementations, the computing device 502 can determine whether to automatically request unpurchased content from the content computer system 506 without being prompted to do so by a user (508). For example, the computing device 502 can periodically (e.g., every day, week, month) check for new and unpurchased content to load onto the computing device 502. Such configurations may be user specified—a user of the computing device 502 can specify that the device should check for new unpurchased content to load on the computing device 502 once a month. The computing device 502 can wait to request such content from the content computer system 504 until a period of time when the computing device 502 is likely to be idle (not used by a user), such as in the early morning.

The computing device 502 may also be configured to wait until the end of a user's data cycle and may only provide a request for unpurchased content when the user has excess available bandwidth on the user's fixed/limited bandwidth plan. For instance, if a user has a wireless data plan (e.g., 3G/4G data plan) that provides a capped amount of data per month (e.g., 2 GB, 4 GB) at a fixed rate before additional fees are imposed, the computing device 502 can wait until the last day of the billing cycle to determine whether or not to provide a request to the content computer system 504. Such a determination can be based on whether the computing device 502 has unused capacity on their plan that would otherwise be lost. For instance, if the computing device 502 has a monthly data plan where the first 2 GB of data are provided at a fixed fee (e.g., $30) and at the end of the month the computing device 502 has used only 1 GB of the plan allowance, then a determination can be made to obtain unpurchased content due to the available data plan capacity at the end of the billing cycle. In contrast, were the computing device 502 to be at the plan limit at the end of the month, the computing device 502 can determine that unpurchased content should not be requested from the content computer system 504.

The content computer system 504 can receive a request for unpurchased content from the computing device 502 (512), and can determine whether to provide unpurchased content to the computing device 502 and/or a user associated with the computing device 502 (514). Such a determination can be made based on a variety of factors, such as information indicating whether a user associated with the computing device 502 is trustworthy. For example, the permission module 406 of the computer system 402 can determine whether to provide unpurchased content to the computing device 404. In another example, the computer system 202 can determine whether to provide unpurchased content to the computing device 200 at step B (208), as described with regard to FIG. 2.

In response to determining that the computing device 502 is permitted to receive unpurchased content, the content computer system 502 can identify unpurchased content to provide to the computing device 502 (516). Such a determination can be based on a variety of information associated with the computing device 502 and/or a user of the computing device 502, such as interests expressed by the user and/or the computing device 502 (e.g., the user set-up his/her media preferences as part of an account with the content computer system 504), content that was previously purchased by the user and/or computing device 502, content accessed on third-party websites (e.g., videos viewed, music listened to), and/or recommendations from acquaintances of the user of the computing device 502. For example, the content identification component 410 can identify content to provide to the computing device 404, and the computer system 202 can identify content to provide to the computing device 200 at step C (218), as described with regard to FIG. 2.

The content computer system 504 can provide the identified unpurchased content (518) to the computing device 502 over one or more available network connections, such as the network 416 described with regard to FIG. 4 and/or the network 104 described with regard to FIG. 1. The computing device 520 can receive the unpurchased content (520) and can locally store the unpurchased content on the computing device 502 (522). For example, the unpurchased content storage manager 424 of the computing device 404 can store the unpurchased content 428 in the storage device 426. A variety of techniques can be used to obfuscate and/or restrict access to the unpurchased content on the computing device 504, such as the encrypting the content (e.g., encrypting the music file at step A (302)), segmenting the content (e.g., segmenting the music file at step B (304)), and/or marking the content as free in a storage system.

At some point in time after receiving and storing the unpurchased content on the computing device 502, the computing device 502 can receive user input indicating a request to purchase and access the stored content (524). The computing device 502 can receive payment information (e.g., credit card number, payment account identifier) and, if a network connection to the content computer system 504 is unavailable, can store such information with other identifying information (e.g., content identifier, timestamp for purchase, user/computing device identifier) as purchase information on the computing device 502 (526). Access to the stored content can be provided in response to receiving the purchase request and obtaining payment information/storing purchase information (528). Providing access can include removing any restrictions that may have been used to obfuscate the content in local storage, such as combining the segments for the content back into the content's original file format. If a network connection is available, the computing device 502 can provide the purchase information to the content computer system 504 and, in response to receiving verification that the purchase information has been successfully processed, can provide access to the stored content (528).

Referring to FIG. 5B, in some implementations where the a network connection is unavailable at the time the request to purchase is received (524) and access to the content is provided (528), the computing device 502 can determine whether a threshold amount of time has elapsed since the content was purchased (530). For example, the computing device 502 can be configured to only permit a user to have access to content for a threshold period of time (e.g., one hour, five hours, one day, two days, one week) before processing of the payment information is needed for the access to continue. In response to determining that a threshold amount of time has elapsed, a notice can be provided to a user of the computing device 502 that access will be removed unless a variety of remedial actions are taken, such as establishing a network connection with the content computer system 504 and/or manually entering a payment confirmation code into the computing device 502. If no such remedial action is taken within a threshold amount of time (e.g., one minute, ten minutes, one hour, one day), access to the content can be restricted and/or the content can be deleted from local storage on the computing device 502 (532).

After providing access to the content when a network connection with the content computer system 504 was unavailable (528) and/or providing a notice to a user to take remedial action for the payment information to be processed (532), a network connection can be detected by the computing device 502 (536). For example, the I/O interface 418 of the computing device 404 can detect the availability of the network 416, such as a wireless network that is within range of the computing device 404.

In response to detecting the connection, the purchase information can be provided to the content computer system 504 over the detected network (538) and can be received by the content computer system 504 (540). The content computer system 504 can process the purchase information (542), such as attempting to debit a payment account that is provided with the purchase information. If the payment method is successful, payment confirmation can be provided by the content computer system 504 (544) to and received by the computing device 502 (546). If the payment information is invalid, notification of the invalid payment information can be provided by the content computer system 504 to the computing device 502 (548). In response to receiving such an indication, the computing device 502 can provide a notice to the user of the computing device 502 of the invalid payment method (532) and/or can restrict access to or delete the content for which the payment method was invalid (534).

Figure 6:
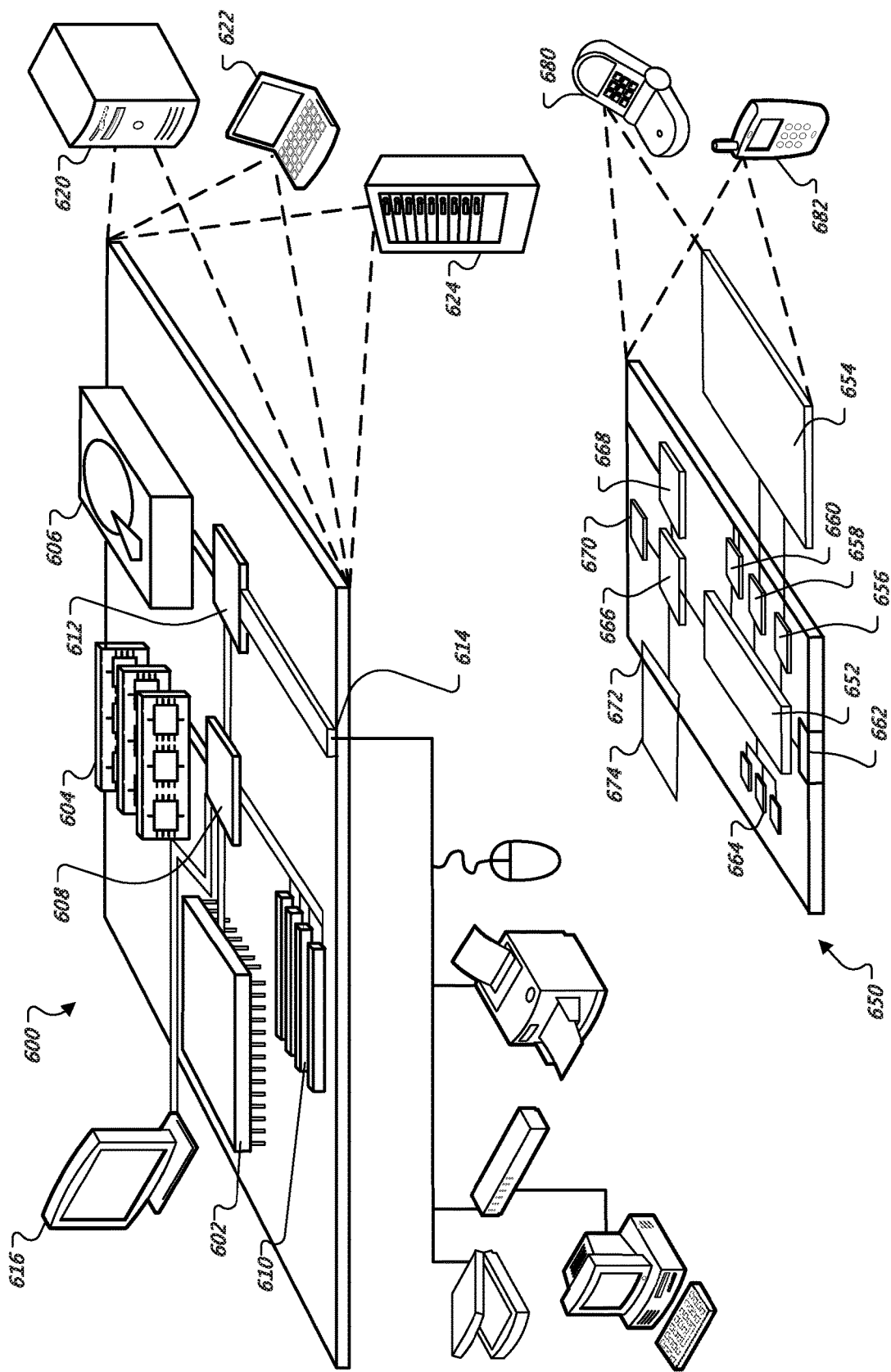
FIG. 6 is a block diagram of example computing devices.

FIG. 6 is a block diagram of example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing unpurchased content to a computing device may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for managing and granting access to digital content obtained from a computer server system, the method comprising:
    receiving, at a computing device and from the computer server system, the digital content that is for sale and that is received without having yet been purchased by a user of the computing device;
    storing the digital content as one or more files at one or more addresses in a local file system on the computing device in a manner that prohibits user access to the digital content;
    after storing the digital content on the computing device and while the computing device is not communicatively connected to the computer server system:
        receiving user input that indicates the user is purchasing at least a portion of the stored digital content;
        verifying that user account information is available on the computing device for causing payment to be made for purchase of the at least a portion of the stored digital content automatically upon detecting that the computing device has become communicatively connected to the computer server system;
        in response to the received user input, storing information that indicates the user purchased the portion of the digital content; and
        providing, after storing the information, the user with access to the purchased portion of the digital content, wherein the access is provided to the purchased portion of the digital content without being communicatively connected to the computer server system; and
    in response to determining that the user has had access to the purchased portion for at least a first threshold amount of time without the stored information having been provided to the computer server system, outputting a notification on the computing device to (i) establish a network connection for transmitting the stored information to the computer server system or (ii) enter a payment confirmation code for the purchased portion of the digital content from the computer system, wherein the payment confirmation code is obtained from the computer server system via another computing device.

2. The computer-implemented method of claim 1, further comprising:
    determining, by the computing device, whether the stored information has been transmitted to the computer system or the payment confirmation code has been entered within a second threshold period of time since the notification was output;
    in response to determining that the stored information has not been transmitted to the computer system and that the payment confirmation code has not been entered within the second threshold period of time, automatically disabling access to the purchased portion until the stored information is provided to the computer server system.

3. The computer-implemented method of claim 2, wherein automatically disabling access to the purchased portion of the digital content comprises automatically deleting the purchased portion of the digital content from a local file system on the computing device.

4. The computer-implemented method of claim 2, wherein automatically disabling access to the purchased portion of the digital content comprises hiding the digital content on the local file system so that the digital content is not accessible to applications running on the computing device.

5. The computer-implemented method of claim 4, wherein hiding the digital content comprises removing the digital content from a file index for the local file system.

6. The computer-implemented method of claim 4, wherein hiding the digital content comprises designating the one or more addresses in the local file system where the digital content is stored as free storage locations on the local file system.

7. The computer-implemented method of claim 1, wherein:
    the one or more addresses are initially designated as free storage location on the local file system and the digital content is not included in a file index for the local file system, and
    providing the user with access to the purchased portion of the digital content comprises adding the digital content to the local file system and designating the one or more addresses as containing the digital content.

8. The computer-implemented method of claim 1, wherein:
    the digital content initially stored on the local file system with one or more digital security features so that the digital content is not accessible to applications running on the computing device, and providing the user with access to the purchased portion of the digital content comprises removing or unlocking the one or more digital security features from the digital content.

9. The computer-implemented method of claim 8, wherein the one or more digital security features include encryption of the digital content.

10. The computer-implemented method of claim 1, wherein the digital content is received on the computing device proactively without the user having requested the digital content specifically and based on an analysis of content preferences for the user.

11. A computing device for managing and granting access to digital content obtained from a computer server system, the computing device comprising:
   one or more processors;
   an interface to receive, from the computer server system, the digital content that is for sale and that is received without having yet been purchased by a user of the computing device;
   a local file system arranged to store the digital content as one or more files at one or more addresses in the local file system in a manner that prohibits user access to the digital content;
   an access module provided by the one or more processors executing a set of access module instructions, the access module being programmed to perform the following operations:
      after the digital content is stored on the computing device and while the computing device is not communicatively connected to the computer server system:
         receive user input that indicates the user is purchasing at least a portion of the stored digital content;
         verify that user account information is available on the computing device for causing payment to be made for purchase of the at least a portion of the stored digital content automatically upon detecting that the computing device has become communicatively connected to the computer server system;
         in response to the received user input, store information that indicates the user purchased the portion of the digital content; and
         provide, after storing the information, the user with access to the purchased portion of the digital content, wherein the access is provided to the purchased portion of the digital content without being communicatively connected to the computer server system; and
      in response to determining that the user has had access to the purchased portion for at least a first threshold amount of time without the stored information having been provided to the computer server system:
         output a notification on the computing device to (i) establish a network connection for transmitting the stored information to the computer server system or (ii) enter a payment confirmation code for the purchased portion of the digital content from the computer system, wherein the payment confirmation code is obtained from the computer server system via another computing device.

12. The computing device of claim 11, wherein the access module is further programmed to:
   determine whether the stored information has been transmitted to the computer system or the payment confirmation code has been entered within a second threshold period of time since the notification was output;
   in response to determining that the stored information has not been transmitted to the computer system and that the payment confirmation code has not been entered within the second threshold period of time, automatically disable access to the purchased portion until the stored information is provided to the computer server system.

13. The computing device of claim 12, wherein automatically disabling access to the purchased portion of the digital content comprises automatically deleting the purchased portion of the digital content from a local file system on the computing device.

14. The computing device of claim 12, wherein automatically disabling access to the purchased portion of the digital content comprises hiding the digital content on the local file system so that the digital content is not accessible to applications running on the computing device.

15. The computing device of claim 14, wherein hiding the digital content comprises removing the digital content from a file index for the local file system.

16. The computing device of claim 14, wherein hiding the digital content comprises designating the one or more addresses in the local file system where the digital content is stored as free storage locations on the local file system.

17. The computing device of claim 11, wherein:
   the one or more addresses are initially designated as free storage location on the local file system and the digital content is not included in a file index for the local file system, and
   providing the user with access to the purchased portion of the digital content comprises adding the digital content to the local file system and designating the one or more addresses as containing the digital content.

18. The computing device of claim 11, wherein:
   the digital content initially stored on the local file system with one or more digital security features so that the digital content is not accessible to applications running on the computing device, and
   providing the user with access to the purchased portion of the digital content comprises removing or unlocking the one or more digital security features from the digital content.

19. The computing device of claim 18, wherein the one or more digital security features include encryption of the digital content.

20. The computing device of claim 11, wherein the digital content is received on the computing device proactively without the user having requested the digital content specifically and based on an analysis of content preferences for the user.

* * * * *